United States Patent
Delano et al.

(10) Patent No.: US 6,260,351 B1
(45) Date of Patent: Jul. 17, 2001

(54) CONTROLLED SPRING RATE GEARBOX MOUNT

(75) Inventors: Peter G. Delano, Manchester; Alexander P. Girgenti, Coventry; William T. Carson, Colchester, all of CT (US); William K. Barcza, Palm City, FL (US); Thomas G. Richard, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/209,022

(22) Filed: Dec. 10, 1998

(51) Int. Cl.$^7$ .................................................. F02C 7/20
(52) U.S. Cl. ................................... 60/39.31; 60/226.1
(58) Field of Search ........................ 60/39.31, 39.32, 60/39.33, 39.091, 226.1, 223; 244/54

(56) References Cited

U.S. PATENT DOCUMENTS 2,978,869 * 4/1961 Hiscock et al. ...................... 60/39.31
3,543,588 * 12/1970 Richardson ......................... 60/39.31
5,782,430 * 7/1998 Mouille ............................. 244/17.27

* cited by examiner

Primary Examiner—Ted Kim

(57) ABSTRACT

A gearbox mounting arrangement for a gas turbine engine includes a controlled spring rate mount that has an appropriate stiffness level to minimize the transmission of loads from the engine case to the gearbox. The controlled spring rate mount is generally T-shaped and includes a cross-member that attaches at the ends thereof to spaced locations on the engine case and a substantially perpendicular leg fixed to the cross-member and having a free end that attaches to the gearbox. The cross-member bends to accommodate the application of vertical loads from the engine case to the gearbox instead of transmitting the loads to the gearbox which would deform the gearbox housing during a high rotor imbalance event.

6 Claims, 2 Drawing Sheets

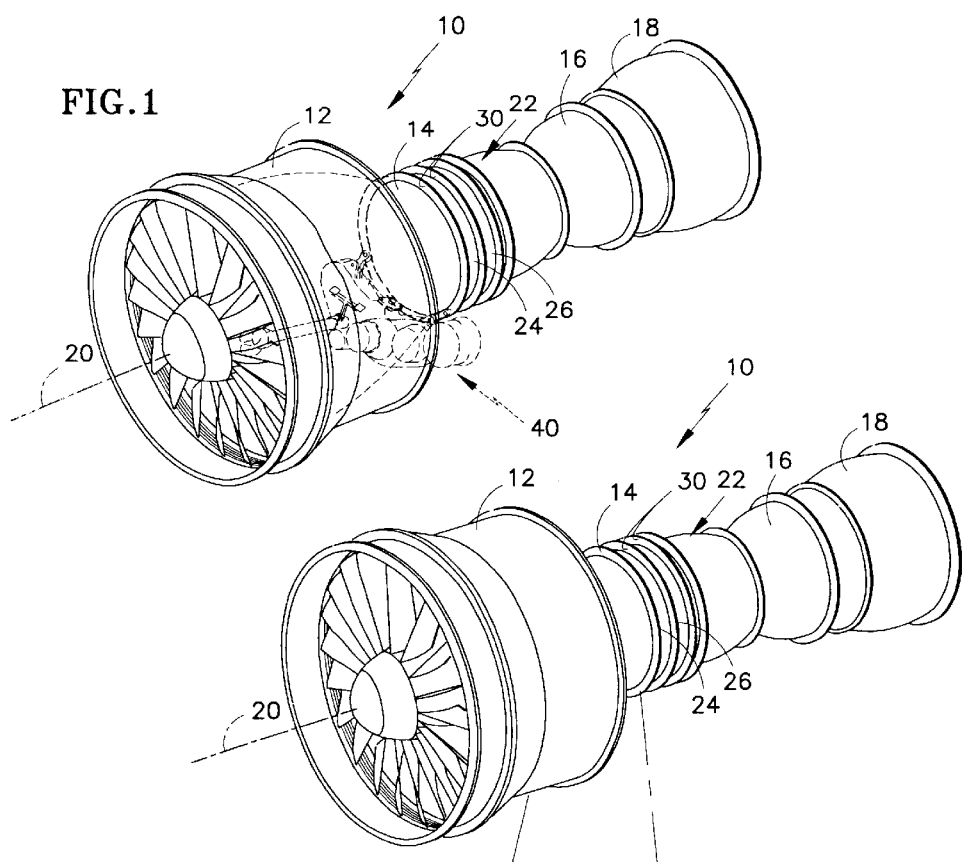
FIG.1
FIG.2
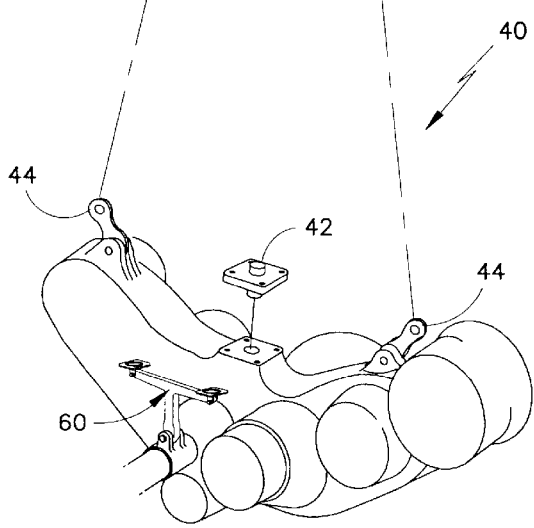

CONTROLLED SPRING RATE GEARBOX MOUNT

TECHNICAL FIELD

The present invention relates to gas turbine engines, and more particularly to providing a resilient mounting arrangement for a gearbox of the engine to minimize damage to the gearbox in the event of a high rotor imbalance condition such as a fan blade loss.

BACKGROUND ART

Modern gas turbine aircraft engines have a gearbox that is mounted on their external cases. The gearbox is generally positioned under the engine's core or fan case and uses power from the engine to drive the major accessories needed for engine functions such as generators for electricity, pumps for circulating fluids and heat exchangers for cooling oil or heating fuel. The accessories are frequently mounted on the gearbox.

The main gearbox of modern turbofan engines such as the Model PW4000, manufactured by the Pratt & Whitney Division of United Technologies Corporation, is mounted within the engine core cowl and is driven by an angle gearbox through a towershaft from the high-pressure compressor. The accessory drives for various components, such as the hydraulic pump, are mounted on the gearbox. The main gearbox drives the fuel pump, scavenge pump, the electrical generator for the electronic engine control, external deoiler, hydraulic pump, and the integrated drive generator (for aircraft electricity).

Various mounting arrangements are used to mount the gearbox to the external case. The gearbox is often connected to the engine case at two or more locations along the length of the gearbox. For example, a forward V-shaped link may be used to fasten the front of the gearbox to the engine. A plurality of side hanger links may be used on either side of the gearbox housing to stabilize the gearbox. Further, a mounting plate may also be used to fasten the gearbox housing to the engine case to provide alignment of the gearbox with respect to the engine case and prevent undesirable movement of the gearbox relative to the engine. Thus, the gearbox may be connected to the engine by a hard mount, that is, a connection which is essentially inflexible and immobile such that case deflections are transmitted to the gearbox. This hard mount arrangement does impose undesirable loads on the mounting hardware and on the gearbox itself.

One problem caused by mounting the gearbox to the engine case is subjecting the gearbox to high loads caused by rotor imbalances. Severe rotor imbalance can occur in an engine, particularly after a fan blade breaks off from the rotor assembly. One cause of fan blade loss is impact with foreign objects, such as birds, hailstones or other objects which, on occasion, are ingested into the engine. The detached fan blade is thrown outwardly and passes through the fan case, but is typically caught by the fabric wraps in the fan containment case assembly. Blade loss produces an imbalance in the rotor and causes the rotor shaft to deflect radially outwardly. The more the rotor deflects, the greater is the radial load on the rotor bearing supports.

The rotor imbalance loads are transmitted from the bearing supports to the engine cases and ultimately to the gearbox fastened to the engine case. The gearbox is forced to move with the engine as the gearbox is fastened to the engine cases. Blade loss loads have been traditionally underestimated with respect to gearbox structural design. If the vibratory loads transmitted to the gearbox are high, the gearbox may not be able to sustain the imbalance loads and this may result in the failure of the gearbox housing itself, and often the liberation of the accessories themselves from the gearbox.

When the gearbox housing breaks, oil from within the gearbox may splash over the hot cases of the engine and immediately ignite, causing a fire. The release of oil from within the gearbox also potentially damages the internal components of the gearbox as they would have to operate without lubrication. If a fuel-bearing accessory breaks off from the gearbox or pulls apart, spilled fuel may cause a fire. If the generator pulls off, a very large component is liberated that can potentially break through the engine cowling itself and ultimately hit an aircraft control surface.

Consequently, gearbox housings have been made thicker, the mount points stronger, and the accessory vendor design requirements have been increased. However, these prior art solutions have resulted in substantially heavier hardware which in turn has resulted in the gearbox mount loads to increase. In turn, the efficiency of the engines is adversely impacted by heavier hardware.

It is also known to use a mounting arrangement having some flexibility or mobility to absorb energy and thus prevent the gearbox from engine case deflections and distortions. However, the flexible mounting arrangements of the prior art adversely compromise the life of the hardware as the elastomeric materials used to introduce the desired flexibility harden when cycled in a high temperature environment.

Thus, the challenge for modern gas turbine engines, during high rotor imbalance events, is the limiting of damage to the gearbox mounts and the gearbox itself.

DISCLOSURE OF THE INVENTION

A primary object of the present invention is to provide a gearbox mounting arrangement that protects the gearbox from the undesirable effects of case deflections and distortions experienced during high rotor imbalance events such as a fan blade loss condition.

According to the present invention, a gearbox mounting arrangement for a gas turbine engine includes a controlled spring rate mount that attaches the gearbox to the engine case, the controlled spring rate mount has an appropriate stiffness level to minimize load transmission to the gearbox from the engine case thus minimizing damage caused to the gearbox by high deflection loads during a high rotor imbalance event, such as a fan blade loss condition. The controlled spring rate mount is T-shaped with a cross-member which attaches at the ends thereof to spaced locations on the engine case and a substantially perpendicular leg fixed to the cross-member and having a free end which attaches to the gearbox. The cross-member bends in response to deflections of the engine case caused by high rotor imbalance events, thus reducing the stress applied to the gearbox and minimizing the deformation of the front face of the gearbox.

A primary advantage of the present invention is the minimization of damage to the gearbox housing, and accessories during large rotor deflections and imbalance conditions, such as in the event of a fan blade loss. The controlled spring rate mount of the present invention reduces the transmission of load to the gearbox. A further advantage of the gearbox mount of the present invention is its ability to provide an appropriate mounting structure for the gearbox during normal operating conditions. Another advantage is the ease and cost of manufacturing and incorporating into the gearbox of the prior art the controlled spring rate mount of the present invention. The simplicity of the structure of the gearbox mount and the use of economic and readily available materials, allows for cost effective manufacturing processes. Further, gearboxes of the prior art can be retrofitted to include the present invention in a cost-effective manner as the present invention fits into the envelope of prior art gearboxes. The mounting arrangement of the present invention does not require periodic maintenance and is, thus, cost effective to incorporate into prior art engines. The gearbox housing can be made lighter as the strength of the gearbox housing does not have to be increased due to the present invention. As a result, the use of the controlled spring rate gearbox mount of the present invention is beneficial to the efficiency of the engine.

The foregoing and other objects, features and advantages of the present invention will become more apparent in the following detailed description of the best mode for carrying out the invention and from the accompanying drawings which illustrate an embodiment of the invention.

BRIEF DESCRIPTION OF THE DRAWINGS

FIG. 1 is a perspective view of a typical axial flow, turbofan gas turbine engine showing a gearbox mounted to the engine's external case.

FIG. 2 is a perspective view of the gas turbine engine of FIG. 1 with an enlarged view of the gearbox.

BEST MODE FOR CARRYING OUT THE INVENTION

Figure 3:
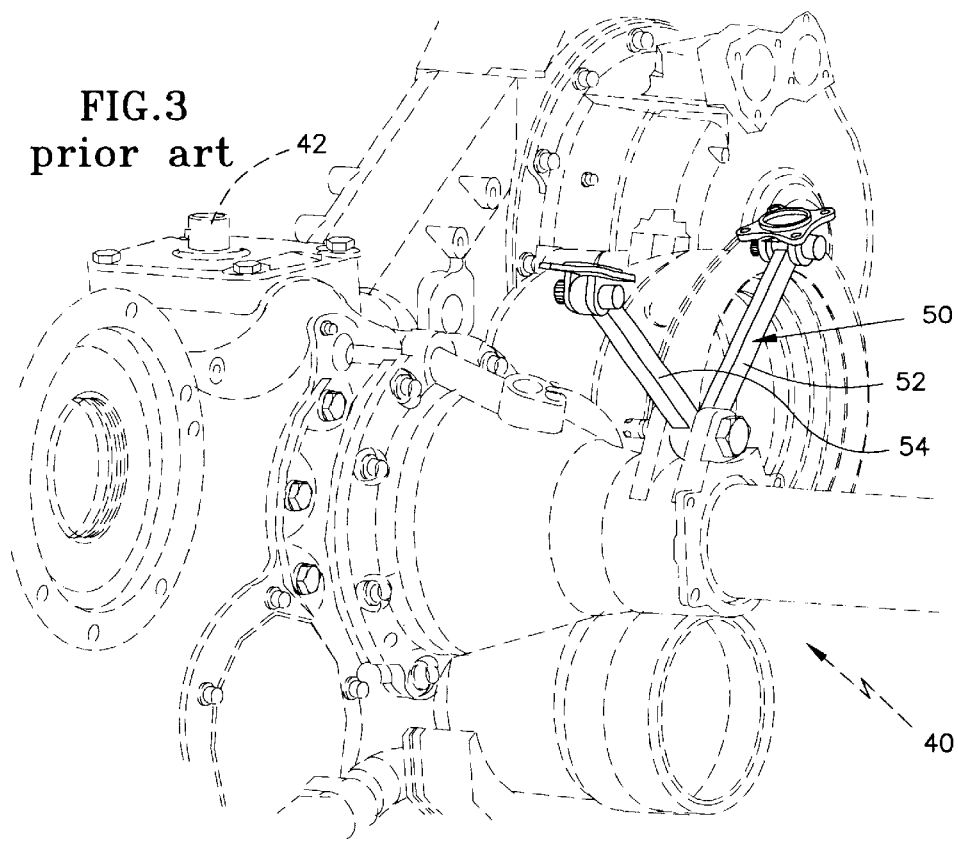
FIG. 3 is a perspective view showing the mounting arrangement of the prior art for the gearbox housing.

Referring to FIG. 1, a gas turbine engine 10 includes as its principal components a fan section 12, a compression section 14, a combustion section 16 and a turbine section 18. The compression and turbine sections each contain one or more compressors and turbines (not shown) which rotate about a central rotational axis 20. The principal components are circumscribed by an essentially cylindrical external case 22 which serves as a main structural support for the engine. The external case is usually constructed of individual cases, such as cases 24 and 26, which are joined together at bolted flanges such as flange 30. A gearbox 40 is mounted to the external case 22.

Referring to FIG. 2, the gearbox 40 is mounted to the external case by mount 42 and side hanger links 44. The mount 42 fastens the gearbox housing to the engine case to provide alignment of the gearbox relative to the engine case. The plurality of hanger links 44 position and stabilize the gearbox with respect to the engine case. The gearbox is further attached to the engine by the controlled spring rate mount 48 of the present invention which is located axially forward of the other mounts 42 and 44. The mounts 42 and 44 may be hard mounts which connect the gearbox 40 to the engine case by essentially inflexible, immobile connections that transmit case deflections and distortions to the gearbox. During a blade loss event, loads transmitted throughout the engine can be extremely high. It is often very difficult to maintain structural integrity of the gearbox whose case and housing are often made of lightweight, but low strength materials such as aluminum. In the prior art, the problem of sustaining high loads was solved by reducing the blade loss loads, or by strengthening the accessory housing which significantly increases the engine weight or by using flexible mounting arrangements which would have a limited life due to the exposure of the flexible materials to a high temperature environment.

Referring to FIG. 3, a V-shaped mounting arrangement 50 of the prior art for a gearbox secures the gearbox 40 to the engine case 22. The right 52 and left members 54 of the V-shaped mount 50 transmit the vertical or radial loads imparted from the engine case to the gearbox. However, this V-shaped mount provides a very stiff load path to the transmission of loads from the engine case to the gearbox because the right and left members are not very flexible. The vertical loads are transmitted through the V-shaped mount in tension. Thus, with the mount arrangement of the prior art, during a high rotor imbalance event such as a fan blade loss condition, excessive deflection loads are transmitted to the case 22 and in turn to the gearbox through the V-shaped mounting arrangement 50. Deformation of the front face of the gearbox may result as strain is imposed on the front face of the gearbox.

Figure 4:
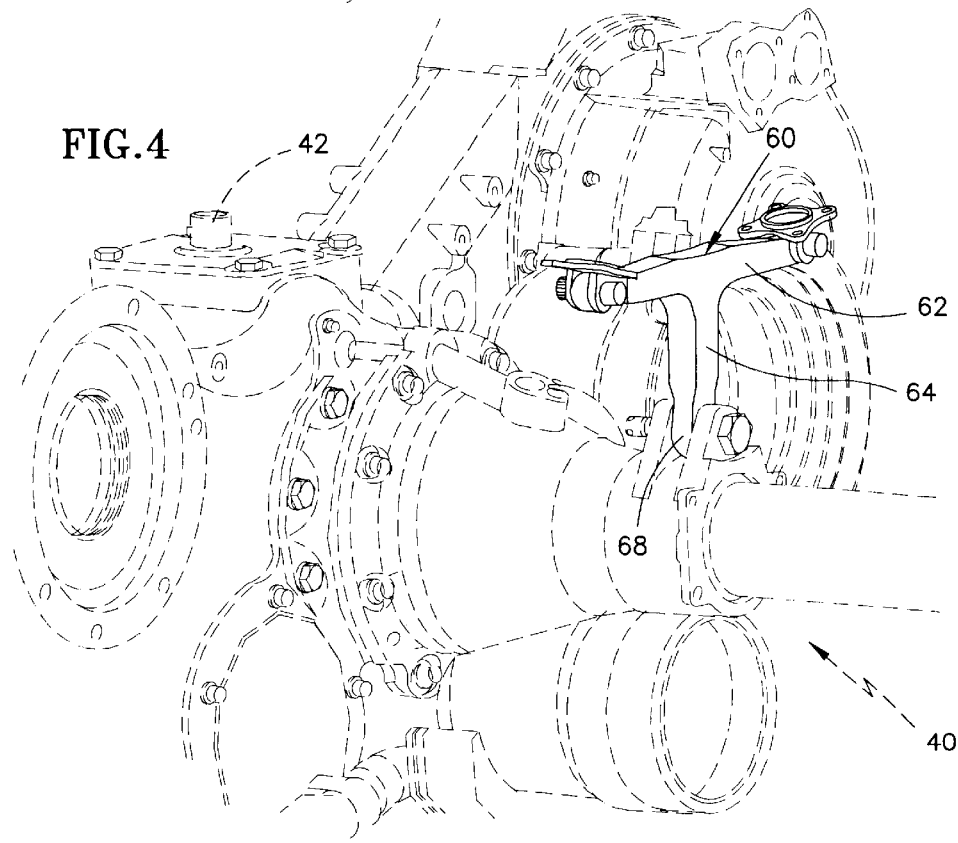
FIG. 4 is a perspective view similar to FIG. 3 showing the controlled spring rate mount of the present invention for the gearbox housing which is shown in broken lines.

Referring to FIG. 4, the controlled spring rate gearbox mount 60 of the present invention is generally T-shaped and includes a cross-member 62 which is attached to the engine case 22 at the ends thereof. The T-shaped mount further includes a substantially perpendicular leg 64 whose free end 68 is attached to the gearbox 40.

In contrast to the prior art, the mounting arrangement of the present invention has a lower stiffness level or spring rate which reduces the vertical or radial loads transmitted to the gearbox. The cross-member 62 of the T-shaped mount 60 bends to accommodate the application of vertical loads transmitted from the engine case 22 to the gearbox 40 during a high rotor imbalance event. Thus, the mount of the present invention is resilient and yields to a reduced spring rate instead of transmitting excess loads to the gearbox which may deform the front face of the gearbox. The controlled spring rate mount maintains the required load capability but has a larger deflection capability to accommodate the application of vertical loads from the deflections of the engine case in response to high rotor imbalance events.

For the engine such as the Model PW4000, the cross-member 62 and perpendicular leg 64 of the T-shaped mount 60 are generally rectangular in cross-section. The T-shaped mount is made of AMS 6532 (Aermet 100) which meets the stiffness and load requirements. The length of the cross-member 62 of the T-shaped mount is approximately nine inches (9") while the length of the perpendicular leg 64 is approximately four inches (4"). The controlled spring rate mount of the present invention is four times more flexible than the V-shaped mount of the prior art. Further, it has been analytically shown that approximately thirty-two percent (32%) of load reduction from the engine case to the gearbox is achieved by using the controlled spring rate mount of the present invention as opposed to the V-shaped mount of the prior art. It should be understood that the dimensions and measures of load reduction and flexibility have been disclosed with respect to a particular engine model, in particular the Model PW4000. These dimensions and measurements vary with engine type.

A primary advantage of the present invention gearbox mounting arrangement is a minimization of damage to the gearbox thus, resulting in a durable gearbox in the event of large rotor deflections and imbalance, such as a fan blade loss. A further advantage of the present invention is its ability to provide an appropriate mounting structure to the gearbox during both normal operation and a fan blade loss event. Another advantage is the ease and cost of manufacturing and incorporating the controlled spring rate mount of the present invention. The simplicity of the structure and the use of economical materials allows for cost effective manufacturing processes. Further, current, prior art gearboxes can be retrofitted to include the gearbox mount in a cost-effective manner. The present invention fits into the envelope of prior art gearboxes. By incorporating the present invention gearbox mounts, current engines limit damage to the gearbox housing during fan blade loss events.

Although the invention has been shown and described with respect to detailed embodiments thereof, it should be understood by those skilled in the art that various changes in form and detail thereof may be made without departing from the spirit and the scope of the claimed invention. The controlled spring rate gearbox mount can be generally Y-shaped having a cross-member that accommodates some bending in response to the application of radial loads from the engine case. The bending of the cross-member would protect the gearbox from undesirable effects of case deflections and distortions.

What is claimed is:

1. A mounting arrangement for a gearbox of a gas turbine engine having an engine case, comprising
   a controlled spring rate mount including a cross-member which attaches at the ends thereof to spaced locations on the engine case and a single leg fixed to said cross-member and having a free end which attaches to the gearbox,
   wherein the transmission of loads from the engine case to the gearbox during a high rotor imbalance condition are accommodated by the bending of the cross-member in response to the application of radial loads from the engine case so as to protect the gearbox from undesirable effects of case deflections and distortions.

2. The mounting arrangement according to claim 1, wherein the controlled spring rate mount is generally T-shaped.

3. The mounting arrangement according to claim 1 wherein said leg is fixedly attached to said cross-member.

4. The mounting arrangement according to claim 1 wherein said leg and said cross-member are integral to each other.

5. A mounting arrangement for a gearbox of a gas turbine engine having an engine case, comprising:
   a controlled spring rate mount including a cross-member which attaches at the ends thereof to spaced locations on the engine case and a leg fixed to said cross-member and having a free end which attaches to the gearbox,
   wherein the transmission of loads from the engine case to the gearbox during a high rotor imbalance condition are accommodated by the bending of the cross-member in response to the application of radial loads from the engine case so as to protect the gearbox from undesirable effects of case deflections and distortions wherein the controlled spring rate mount is generally T-shaped, the cross-member being generally straight and the leg being generally perpendicular to the cross-member.

6. A mounting arrangement for a gear box of a gas turbine engine having an engine case, said mounting arrangement comprising:
   a cross-member having a first cross-member end and a second cross-member end with a middle portion disposed therebetween, said first cross-member end and said second cross-member end attaching to said engine case; and
   a leg having a first leg end and a second leg end with said first leg end attaching to said middle portion of said cross-member and said second leg end attaching to said gear box such that said cross-member and said leg form a mount for transmission of loads from said engine case to said gear box during rotor imbalance condition to be accommodated by the bending of said cross-member in response to application of radial loads from said engine case to protect said gear box from undesirable effect of said engine case deflections and distortions.

* * * * *